United States Patent
Takeda et al.

(10) Patent No.: US 10,230,437 B2
(45) Date of Patent: Mar. 12, 2019

(54) USER TERMINAL, RADIO BASE STATION, AND RADIO COMMUNICATION METHOD

(71) Applicant: NTT DOCOMO, INC., Tokyo (JP)

(72) Inventors: Kazuki Takeda, Tokyo (JP); Hiroki Harada, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/755,145

(22) PCT Filed: Aug. 22, 2016

(86) PCT No.: PCT/JP2016/074394
§ 371 (c)(1),
(2) Date: Feb. 26, 2018

(87) PCT Pub. No.: WO2017/038533
PCT Pub. Date: Mar. 9, 2017

(65) Prior Publication Data
US 2018/0254807 A1    Sep. 6, 2018

(30) Foreign Application Priority Data
Aug. 31, 2015 (JP) ................................. 2015-171453

(51) Int. Cl.
*H04W 72/04* (2009.01)
*H04B 7/0456* (2017.01)
(Continued)

(52) U.S. Cl.
CPC ............. *H04B 7/0473* (2013.01); *H04B 7/04* (2013.01); *H04W 16/28* (2013.01); *H04W 72/04* (2013.01); *H04W 72/0413* (2013.01)

(58) Field of Classification Search
CPC ... H04L 1/1671; H04L 1/1812; H04L 1/1861; H04L 5/0037; H04L 1/003; H04L 1/0072;
(Continued)

(56) References Cited

U.S. PATENT DOCUMENTS 6,137,843 A * 10/2000 Chennakeshu ........ H01Q 1/246
375/340
7,333,420 B2 * 2/2008 Higuchi ............... H04B 1/7107
370/208
(Continued)

OTHER PUBLICATIONS

3GPP TS 36.300 v8.12.0; 3rd Generation Partnership Project; Technical Specification Group Radio Access Network; Evolved Universal Terrestrial Radio Access (E-UTRA) and Evolved Universal Terrestrial Radio Access Network (E-UTRAN) ; Overall description; Stage 2 (Release 8); Mar. 2010, 149 pages.
(Continued)

*Primary Examiner* — James M Perez
(74) *Attorney, Agent, or Firm* — Osha Liang LLP

(57) ABSTRACT

It is possible to secure radio resources allocated to an uplink data channel even when radio resources allocated to an uplink control channel increase. A user terminal according to the present invention includes: a control section that maps an uplink data channel and an uplink control channel on different layers; and a transmission section that multiplexes on an identical radio resource the uplink data channel and the uplink control channel mapped on the different layers to transmit.

8 Claims, 14 Drawing Sheets

(51) Int. Cl.
*H04B 7/04* (2017.01)
*H04W 16/28* (2009.01)

(58) Field of Classification Search
CPC .... H04L 1/0004; H04L 1/001; H04W 72/042; H04W 28/04; H04W 72/0413; H04B 7/0413; H04B 7/0452
USPC ................ 375/130–137, 140–153, 260–285
See application file for complete search history.

(56) References Cited

U.S. PATENT DOCUMENTS

| | | | | |
|---|---|---|---|---|
| 7,486,726 B2* | 2/2009 | Alexander | | H04L 25/0204 375/232 |
| 8,605,810 B2* | 12/2013 | Papasakellariou | | H04L 1/1671 375/267 |
| 8,625,554 B2* | 1/2014 | Zhang | | H04L 1/1861 370/338 |
| 8,774,310 B2* | 7/2014 | Khan | | H04L 5/0023 375/133 |
| 8,891,662 B2* | 11/2014 | Jeong | | H04L 5/0051 375/232 |
| 8,917,796 B1* | 12/2014 | Mayrench | | H04L 5/0028 375/260 |
| 8,995,555 B2* | 3/2015 | Nam | | H04L 1/0031 375/267 |
| 9,270,427 B2* | 2/2016 | Blankenship | | H04L 1/007 |
| 9,294,959 B2* | 3/2016 | Seyama | | H04L 1/1854 |
| 9,596,017 B1* | 3/2017 | Mayrench | | H04L 5/0028 |
| 9,893,863 B2* | 2/2018 | Takeda | | H04W 72/042 |
| 9,986,539 B2* | 5/2018 | Papasakellariou | | H04L 1/1671 |
| 2009/0073922 A1* | 3/2009 | Malladi | | H04L 1/0004 370/328 |
| 2009/0196249 A1* | 8/2009 | Kawamura | | H04B 1/7143 370/330 |
| 2009/0210766 A1* | 8/2009 | Katayama | | H04L 1/0015 714/748 |
| 2009/0220017 A1* | 9/2009 | Kawamura | | H04L 5/005 375/260 |
| 2009/0245190 A1* | 10/2009 | Higuchi | | H04L 47/10 370/329 |
| 2009/0303937 A1* | 12/2009 | Sawahashi | | H04L 5/0064 370/329 |
| 2010/0002575 A1* | 1/2010 | Eichinger | | H04L 5/0046 370/210 |
| 2010/0118773 A1* | 5/2010 | Kawamura | | H04J 13/0059 370/328 |
| 2010/0195624 A1* | 8/2010 | Zhang | | H04B 7/0413 370/335 |
| 2010/0309857 A1* | 12/2010 | Kawamura | | H04J 13/0059 370/329 |
| 2011/0116465 A1* | 5/2011 | Miki | | H04W 72/1215 370/329 |
| 2011/0170625 A1* | 7/2011 | Blankenship | | H04L 1/007 375/295 |
| 2011/0235602 A1* | 9/2011 | Ji | | H04L 5/0007 370/329 |
| 2011/0243007 A1* | 10/2011 | Xiao | | H04B 7/0447 370/252 |
| 2011/0268045 A1* | 11/2011 | Heo | | H04L 1/0027 370/329 |
| 2011/0268080 A1* | 11/2011 | Luo | | H04L 5/0053 370/330 |
| 2011/0274188 A1* | 11/2011 | Sayana | | H04B 7/0639 375/260 |
| 2011/0294439 A1* | 12/2011 | Ofuji | | H04L 1/0003 455/70 |
| 2012/0002568 A1* | 1/2012 | Tiirola | | H04L 1/0026 370/252 |
| 2012/0020433 A1* | 1/2012 | Bhattad | | H04B 7/0417 375/296 |
| 2012/0127953 A1* | 5/2012 | Kawamura | | H04B 7/0413 370/330 |
| 2012/0213187 A1* | 8/2012 | Yang | | H04L 1/0027 370/329 |
| 2012/0243402 A1* | 9/2012 | Kishiyama | | H04L 5/0003 370/216 |
| 2012/0300711 A1* | 11/2012 | Wang | | H04L 5/0091 370/329 |
| 2012/0320805 A1* | 12/2012 | Yang | | H04L 1/18 370/280 |
| 2013/0039284 A1* | 2/2013 | Marinier | | H04L 5/001 370/329 |
| 2013/0107916 A1* | 5/2013 | Liu | | H04B 7/0452 375/219 |
| 2014/0254519 A1* | 9/2014 | Horiuchi | | H04W 72/0406 370/329 |
| 2015/0163793 A1* | 6/2015 | Han | | H04L 1/1861 370/329 |
| 2016/0323076 A1* | 11/2016 | Takeda | | H04W 48/20 |
| 2018/0049173 A1* | 2/2018 | Chen | | H04W 76/28 |
| 2018/0115975 A1* | 4/2018 | Takeda | | H04J 3/00 |
| 2018/0254807 A1* | 9/2018 | Takeda | | H04B 7/0473 |

OTHER PUBLICATIONS

International Search Report issued in International Appln. No. PCT/JP2016/074394, dated Oct. 18, 2016, 2 pages.

Written Opinion issued in International Appln. No. PCT/JP2016/074394, dated Oct. 18, 2016, 3 pages.

\* cited by examiner

UPLINK CONTROL CHANNEL    UPLINK DATA CHANNEL
UPLINK REFERENCE SIGNAL FOR UPLINK CONTROL CHANNEL
UPLINK REFERENCE SIGNAL FOR UPLINK DATA CHANNEL

USER TERMINAL, RADIO BASE STATION, AND RADIO COMMUNICATION METHOD

TECHNICAL FIELD

The present invention relates to a user terminal, a radio communication system, and a radio communication method of a next-generation communication system.

BACKGROUND ART

In UMTS (Universal Mobile Telecommunications System) networks, for purposes of higher data rates, lower delay and the like, Long Term Evolution (LTE) has been specified (Non-Patent Document 1). Further, for purposes of wider bands and a higher speed than LTE, a successor system of LTE (also referred to as, for example, LTE-A (LTE-Advanced), FRA (Future Radio Access), and 5G (5th generation mobile communication system)) has also been studied.

It is assumed that a future radio communication system (e.g. 5G) is demanded to provide a much higher speed and larger volume for use in a mobile broadband, reduce delay and support connection from a large-volume device. Further, for purposes of a much higher speed and larger volume, it is assumed to use a frequency spectrum of a wider band.

Furthermore, an existing LTE system adopts SC-FDMA (Single Carrier-Frequency Division Multiple Access) (or also referred to as DFT-spread OFDM (Discrete Fourier Transform spread Orthogonal Frequency Division Multiplexing) below) as an uplink radio access scheme. Hence, according to the LTE system, a single carrier-based uplink radio channel is defined.

More specifically, the LTE system employs a defined configuration of performing frequency division multiplexing on an uplink control channel (PUCCH: Physical Uplink Control Channel) and an uplink data channel (PUSCH: Physical Uplink Shared Channel), and performing time division multiplexing on the PUCCH and the PUSCH, and a Sounding Reference Signal (SRS: Sounding Reference Signal).

CITATION LIST

Non-Patent Literature

[Non-Patent Literature 1] 3GPP TS 36.300 Rel.8 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

According to the LTE system, radio resources for an uplink control channel are secured, and radio resources other than the secured radio resources are allocated to an uplink data channel. Hence, it is difficult to allocate the radio resources for the uplink control channel to the uplink data channel.

Meanwhile, a future radio communication system such as 5G is assumed to increase a downlink data traffic to realize a much higher speed and larger volume. In this case, it is necessary to allocate more radio resources to the uplink control channel for transmitting Uplink Control Information (UCI) such as transmission acknowledgement information (HARQ-ACK: Hybrid Automatic Repeat reQuest-ACKnowledgement) for the downlink data and downlink Channel State Information (CSI).

Thus, when it is necessary to allocate more radio resources to the uplink control channel, there is a concern that it is difficult to secure radio resources allocated to the uplink data channel. Shortage of radio resources for the uplink data channel is a problem in an existing LTE system, too.

The present invention has been made in view of such a respect, and an object of the present invention is to provide a user terminal, a radio base station and a radio communication method that can secure radio resources allocated to an uplink data channel even when the radio resources allocated to an uplink control channel increase.

One aspect of a user terminal according to the present invention includes: a control section that maps an uplink data channel and an uplink control channel on different layers; and a transmission section that multiplexes on an identical radio resource the uplink data channel and the uplink control channel mapped on the different layers to transmit.

According to the present invention, it is possible to secure radio resources allocated to an uplink data channel even when radio resources allocated to an uplink control channel increase.

DESCRIPTION OF EMBODIMENTS

Figure 1:
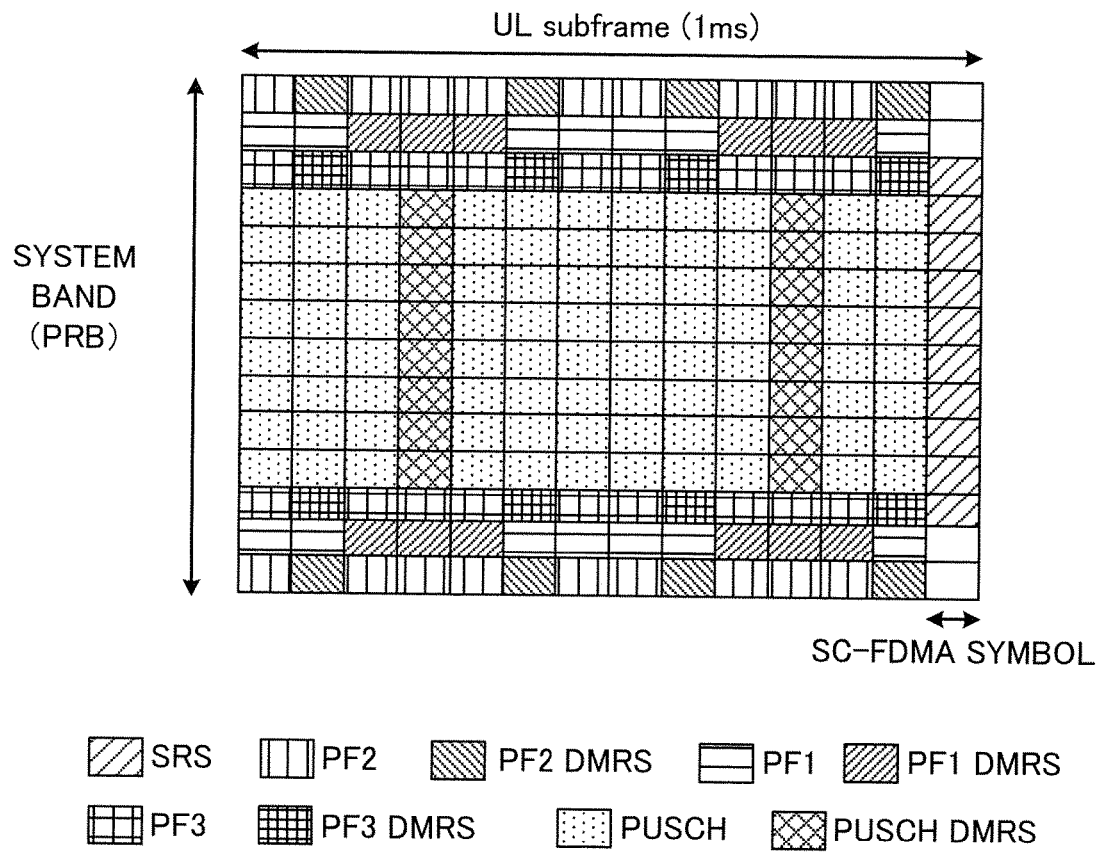
FIG. 1 is a diagram illustrating an example of a configuration of an uplink radio channel.

FIG. 1 is a diagram illustrating an example of a configuration of an uplink radio channel in an LTE system. As illustrated in FIG. 1, the LTE system secures radio resources for PUCCHs on both end domains of a system band and performs frequency division multiplexing on the PUCCHs and a PUSCH. Further, the PUCCHs, the PUSCH and an SRS are subjected to time division multiplexing. A PUCCH format 2 (2a/2b), a PUCCH format 1 (2a/2b) and a PUCCH format 3 are mapped on the radio resources for the PUCCHs from an outer side of the system band.

Further, PUCCHs of a plurality of user terminals are subjected on frequency division multiplexing or/and code division multiplexing on the radio resources for the PUCCHs. The same applies to radio resources for the SRS, too. Meanwhile, it is possible to perform spatial division multiplexing on the PUSCHs of a plurality of user terminals on the radio resources for the PUSCHs. In this regard, demodulation reference signals of the PUSCHs of a plurality of user terminals is subjected to code division multiplexing.

Figure 2A:
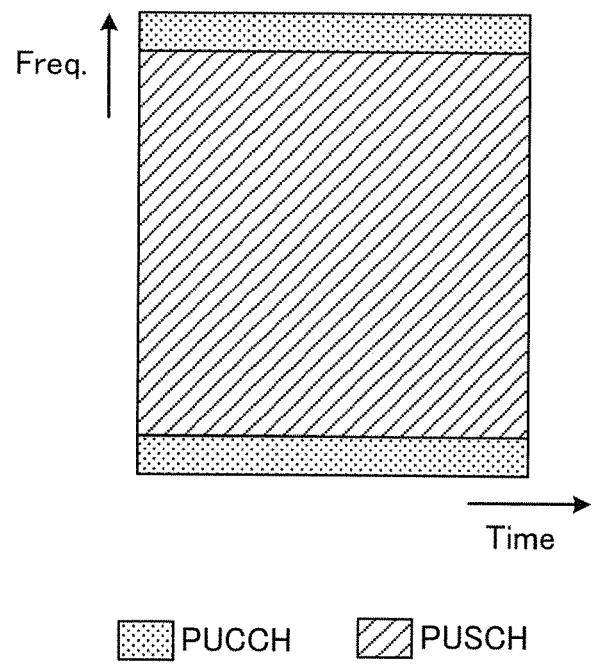
FIGS. 2A and 2B are diagrams illustrating examples of allocation resources of a PUCCH/PUSCH.

FIG. 2 contain diagrams illustrating examples of radio resources allocated to PUCCHs and a PUSCH. As illustrated in FIG. 2A, the LTE system secures radio resources for the PUCCHs and allocates radio resources other than the radio resources for the PUCCHs, to the PUSCH.

Figure 2B:
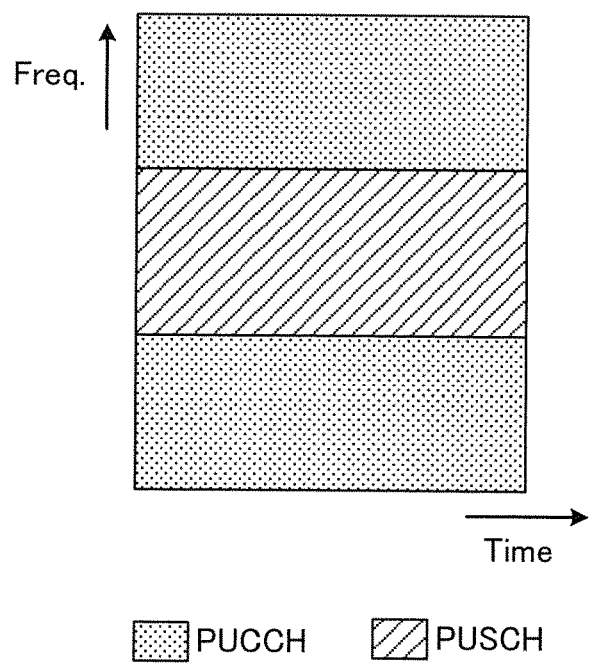

However, as a downlink data traffic increases, it is necessary to allocate many radio resources to an uplink control channel (e.g. PUCCH) for transmitting Uplink Control Information (UCI) such as transmission acknowledgement information (HARQ-ACK) for downlink data and downlink Channel State Information (CSI). As a result, as illustrated in FIG. 2B, there is a concern that it is difficult to secure radio resources allocated to an uplink data channel (e.g. PUSCH).

Hence, the inventors of the present invention have conceived making it possible to secure radio resources allocated to the uplink data channel by mapping the uplink control channel and the uplink data channel on different layers (e.g. layers that are also referred to as streams according to MIMO (Multiple-Input and Multiple-Output)) and arrived at the present invention.

(Radio Communication Method)

A radio communication method according to one Embodiment of the present invention will be described below. Hereinafter, higher layer signaling includes RRC (Radio Resource Control) signaling and broadcast information. Further, downlink layer signaling (layer 1 control signal) is a downlink control channel such as a PDCCH (Physical Downlink Control Channel) or an EPDCCH (Enhanced PDCCH), and may be called physical layer signaling.

Further, a case of two layers (two streams) will be exemplified as an example below. However, the number of layers is not limited to this. As long as the uplink control channel and the uplink data channel are mapped on different layers, the number of layers may be three or more.

Figure 3:
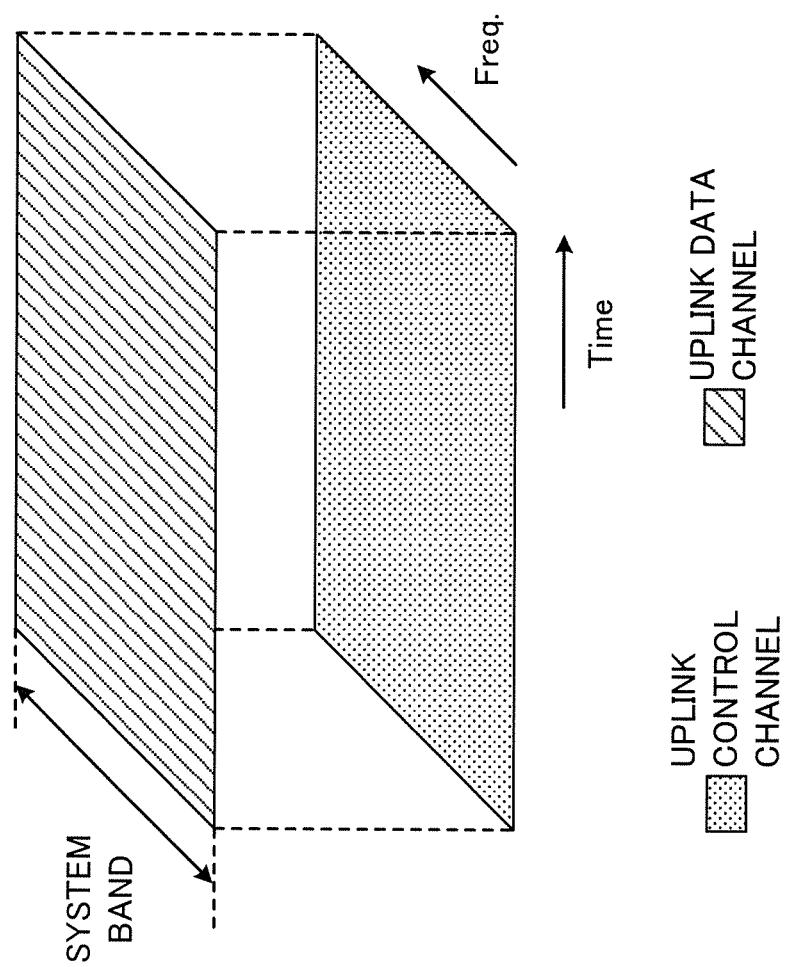
FIG. 3 is a diagram illustrating an example of layer mapping according to this Embodiment.

FIG. 3 is a diagram illustrating an example of layer mapping according to this Embodiment. As illustrated in FIG. 3, a user terminal maps the uplink data channel and the uplink control channel on different layers. Further, the user terminal multiplexes the uplink data channel and the uplink control channel that are mapped on the different layers, on identical radio resources to transmit.

More specifically, in FIG. 3, the uplink data channel and the uplink control channel may be spatially multiplexed on the identical radio resources. A radio base station performs reception processing on the uplink data channel and the uplink control channel that are mapped on the different layers as uplink (UL: Uplink) MIMO (Multiple-Input and Multiple-Output) (UL MIMO) signals by using a plurality of antennas.

Alternatively, in FIG. 3, the uplink data channel and the uplink control channel may be subjected to electrical multiplexing (non-orthogonal multiplexing) on the identical radio resources. The radio base station performs reception processing on the uplink data channel and the uplink control channel that are mapped on the different layers as uplink NOMA (Non-Orthogonal Multiple Access) signals by using an interference canceller (e.g. SIC: Successive Interference Cancellation).

As illustrated in FIG. 3, by mapping the uplink data channel and the uplink control channel on the different layers, it is possible to allocate the uplink data channel to an entire system band. As a result, it is possible to prevent shortage of radio resources for the uplink data channel caused by an increase in the downlink traffic.

As described above, when the uplink data channel and the uplink control channel are transmitted in the different layers, the radio base station needs to demultiplex the uplink data channel and the uplink control channel subjected to spatial multiplexing or electrical multiplexing based on a channel state of each layer. Hence, an uplink reference signal is provided per layer to enable estimation of a channel state per layer, and an uplink reference signal of each layer is orthogonal or quasi-orthogonal.

Figure 4:
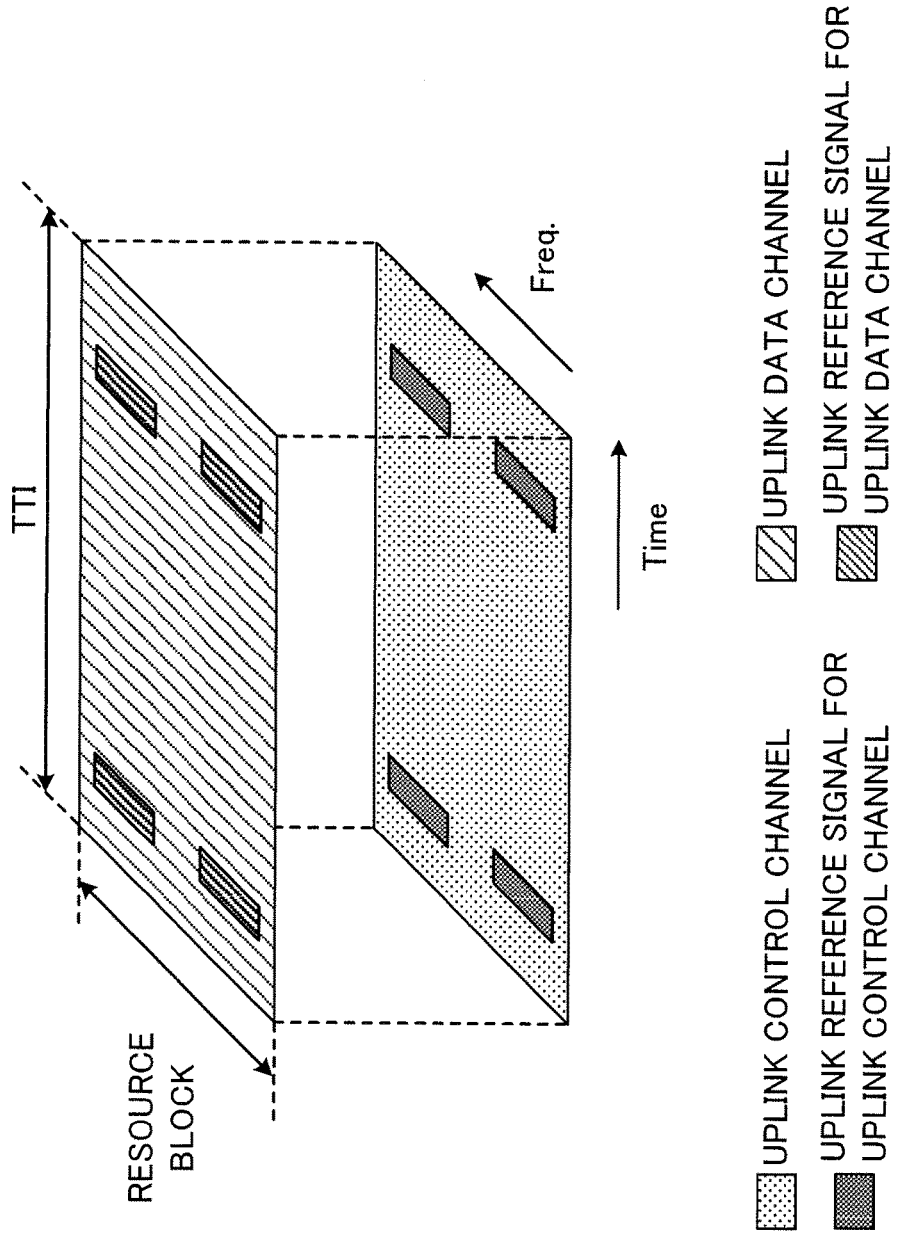
FIG. 4 is an explanatory diagram of an example of an uplink reference signal according to this Embodiment.

FIG. 4 is an explanatory diagram of an uplink reference signal according to this Embodiment. The user terminal generates an uplink reference signal of each layer by using sequences that are orthogonal or quasi-orthogonal between layers. Further, the user terminal maps the uplink reference signal of each layer on identical radio resources. In this regard, the identical radio resources include, for example, at least one resource element and are configured by time resources (at least one time symbol) and/or frequency resources (at least one subcarrier).

For example, in FIG. 4, uplink reference signals of a plurality of layers generated by using orthogonal or quasi-orthogonal sequences are multiplexed (code division multiplexing) on two pairs of subcarriers distant in a frequency direction of a specific time symbol. In this regard, an uplink reference signal mapping position illustrated in FIG. 4 is an exemplary position and is not limited to this. Further, as long as the uplink reference signals of a plurality of layers are subjected to orthogonal multiplexing or quasi-orthogonal multiplexing, a multiplexing scheme is not limited to code division multiplexing and any multiplexing scheme (e.g. at least one of frequency division multiplexing, time division multiplexing and code division multiplexing) may be used. Furthermore, resource allocation units in the frequency domain are illustrated as resource blocks in FIG. 4, yet are not limited to this.

As illustrated in FIG. 4, when the uplink reference signals of a plurality of layers are subjected to orthogonal multiplexing or quasi-orthogonal multiplexing, the radio base station can perform orthogonal demultiplexing or quasi-demultiplexing on an uplink reference signal of each layer and precisely estimate a channel state of each layer. Consequently, the radio base station can demultiplex the uplink data channel and the uplink control channel subjected to spatial multiplexing or electrical multiplexing based on the estimated channel state of each layer.

Figure 5:
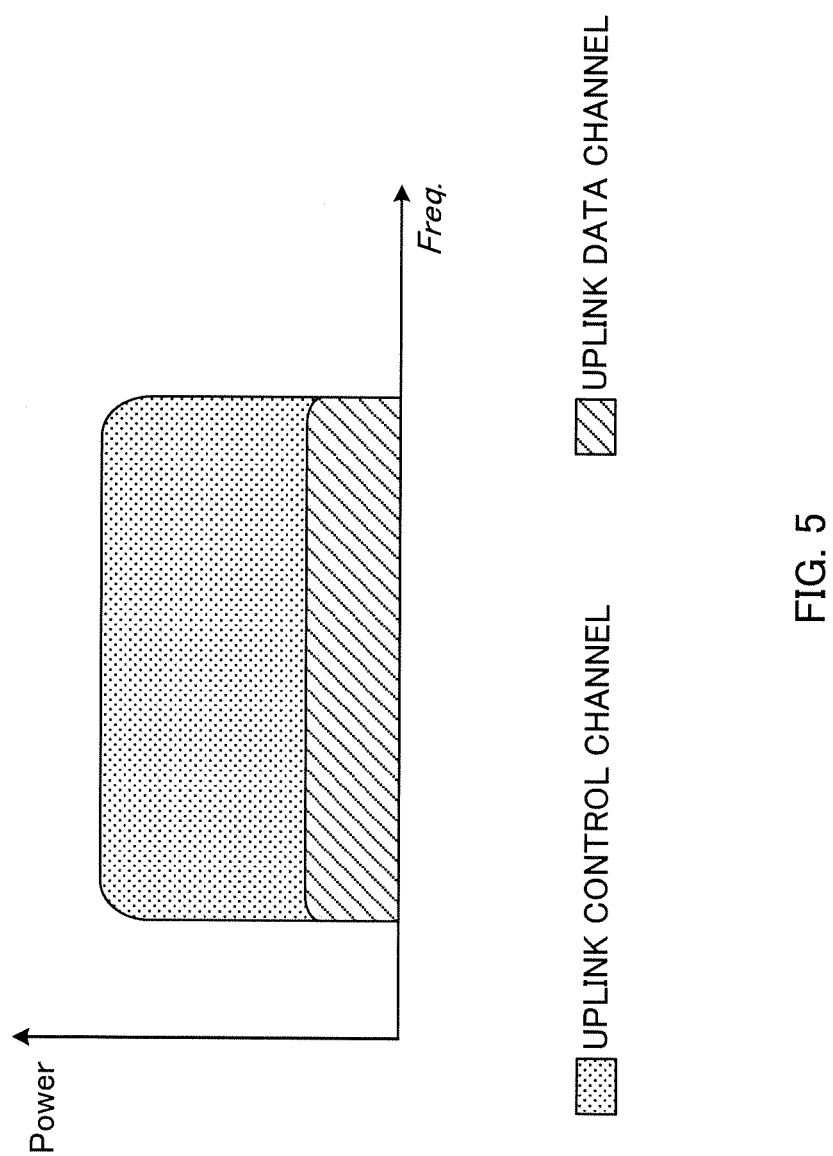
FIG. 5 is an explanatory diagram of an example of uplink transmission power according to this Embodiment.

FIG. 5 is an explanatory diagram of uplink transmission power according to this Embodiment. As illustrated in FIG. 5, the radio base station may control the uplink transmission power of each layer to increase to received signal power of each layer that the uplink control channel is mapped on compared to received signal power of each layer that the uplink data channel is mapped on. By so doing, it is possible to reduce an error rate of the uplink control channel for which higher quality than that of the uplink data channel is demanded.

In this regard, uplink transmission power control of the radio base station is not limited to this. For example, the radio base station may control uplink transmission power of each layer to decrease received signal power of each layer that the uplink control channel is mapped on compared to received signal power of each layer that the uplink data channel is mapped on. By so doing, the user terminal that can sufficiently achieve a little uplink data traffic and uplink control channel quality can keep a reduced interference on surrounding cells and improve entire system performance.

<Spatial Multiplexing>

Next, spatial multiplexing of an uplink data channel and an uplink control channel by a radio communication method according to this Embodiment will be described in detail.

<<Aspect 1>>

Aspect 1 describes a case where a single user terminal spatially multiplexes an uplink data channel and an uplink control channel. The user terminal that includes a plurality of antennas spatially multiplexes an uplink data channel and an uplink control channel that are mapped on different layers by UL MIMO (single-user MIMO).

According to Aspect 1, the user terminal receives instruction information for instructing spatial multiplexing of an uplink data channel and an uplink control channel, from a radio base station by higher layer signaling. When the higher layer signaling instructs the user terminal to spatially multiplex the uplink data channel and the uplink control channel, the user terminal may map the uplink data channel and the uplink control channel on the different layers.

Figure 6:
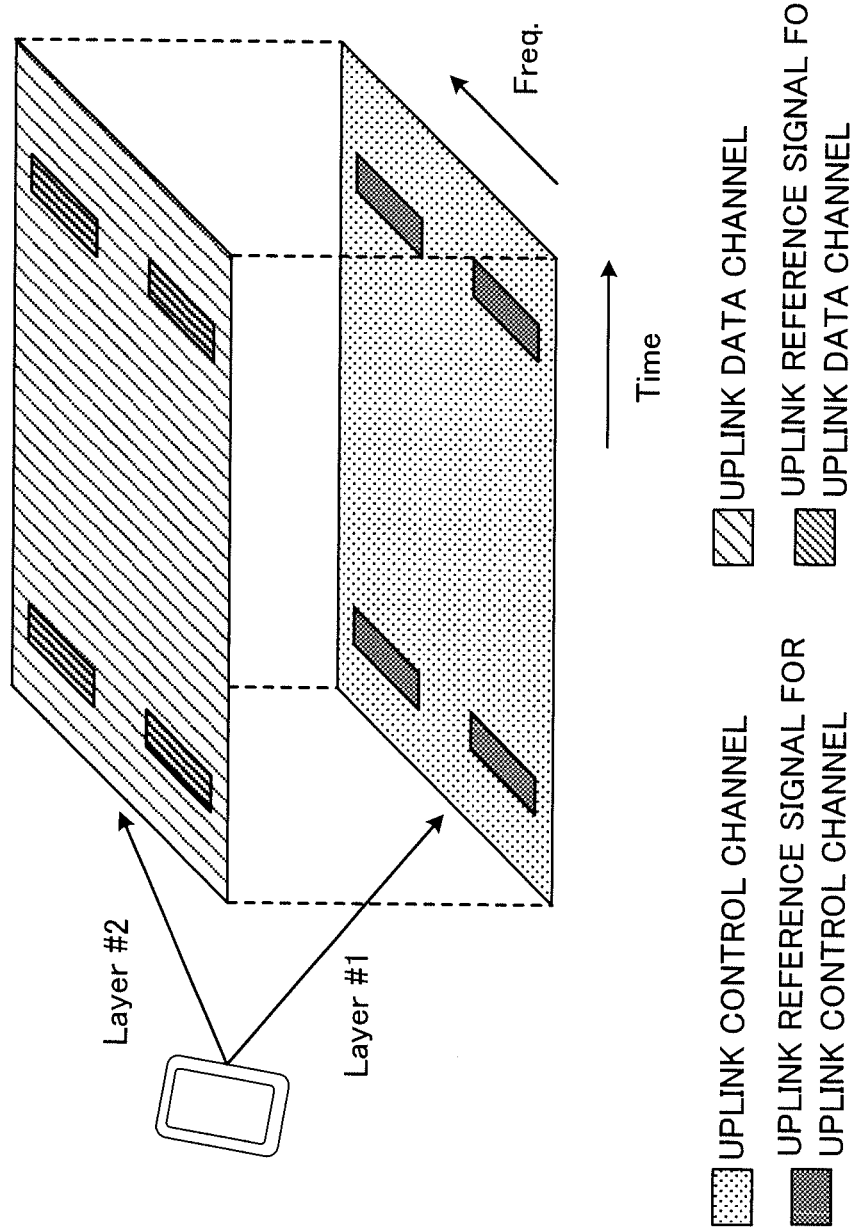
FIG. 6 is a diagram illustrating an example of layer mapping according to Aspect 1.

FIG. 6 is a diagram illustrating an example of layer mapping according to Aspect 1. In FIG. 6, the user terminal receives layer information for instructing layers that the uplink data channel and the uplink control channel are mapped on, from the radio base station by the higher layer signaling or a L1 control signal. When received by the higher layer signaling, the layers that the uplink data channel and the uplink control channel are mapped on are semi-statically fixed. Meanwhile, when received by the L1 control signal, the layers that the uplink data channel and the uplink control channel are mapped on are dynamically changed.

The user terminal maps the uplink data channel and the uplink control channel on the layers instructed by the layer information. For example, in FIG. 6, the user terminal maps the uplink control channel on a layer #1 and maps the uplink data channel on a layer #2 based on the layer information. The user terminal precodes the uplink data channel and the uplink control channel by using different precoding matrices per layer, generates a transmission signal and transmits the generated transmission signal by using a plurality of antennas.

Further, the user terminal generates uplink reference signals of the layers #1 and #2 by using orthogonal or quasi-orthogonal sequences between the layers #1 and #2, and maps the generated uplink reference signal on identical resource elements. Consequently, the radio base station can perform orthogonal demultiplexing on the uplink reference signals of the layers #1 and #2, and, consequently, can demultiplex the uplink control channel of the layer #1 and the uplink data channel of the layer #2 based on a channel state estimated by using the uplink reference signals of the layers #1 and #2.

FIG. 7 contain diagrams illustrating other examples of layer mapping according to Aspect 1. In FIG. 7, the user terminal determines layers that an uplink data channel and an uplink control channel are mapped on without layer information from the radio base station unlike FIG. 6.

Figure 7A:
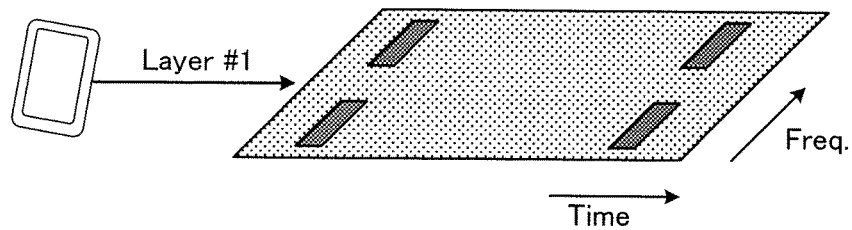
FIGS. 7A, 7B and 7C are diagrams illustrating other examples of the layer mapping according to Aspect 1.
Figure 7B:
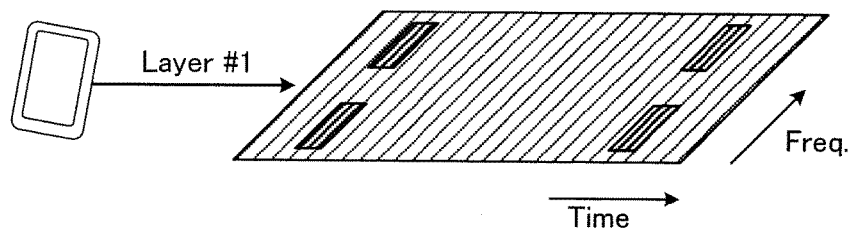

As illustrated in, for example, FIG. 7A, when transmitting only the uplink control channel, the user terminal maps the uplink control channel on the layer #1 (first layer). Further, as illustrated in FIG. 7B, when transmitting only the uplink data channel, the user terminal maps the uplink data channel on the layer #1. Meanwhile, as illustrated in FIG. 7C, when spatially multiplexing and transmitting the uplink data channel and the uplink control channel, the user terminal maps the uplink control channel on the layer #1 and the uplink data channel on the layer #2 (second layer).

Thus, in FIG. 7, both when transmitted alone and when concurrently transmitted with the uplink data channel, the uplink control channel is mapped on the layer #1. Meanwhile, a layer that the uplink data channel is mapped on is changed according to whether or not there is an uplink control channel. In this case, a layer that the uplink data channel is mapped on may be changed per resource block (PRB: Physical Resource Block).

Figure 7C:
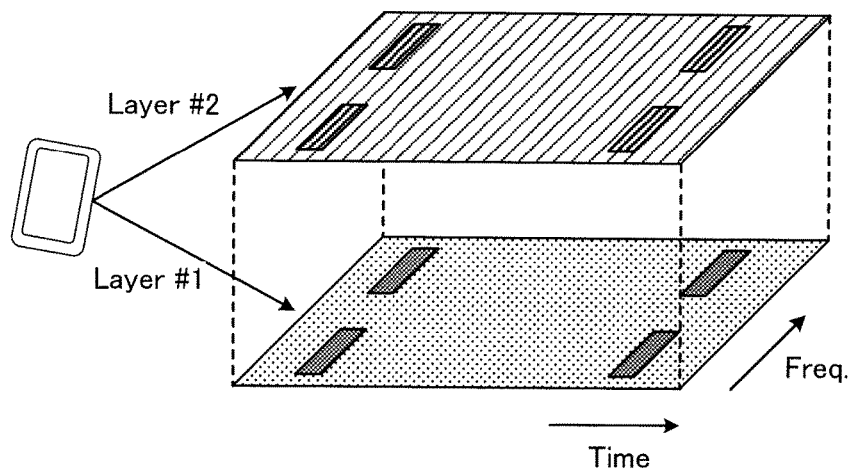

For example, layer mapping illustrated in FIG. 7C is applied to resource blocks in both end domains (resource domains secured for the uplink control channel) of the system band, and layer mapping illustrated in FIG. 7B is applied to resource blocks other than the both end domains. Consequently, it is possible to increase radio resources that can be allocated to the uplink data channel while reusing a method for allocating the uplink control channel in the LTE system.

Figure 8A:
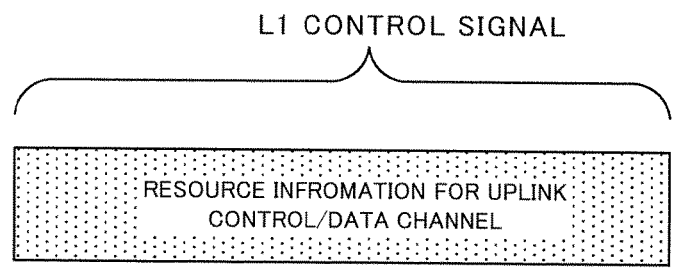
FIGS. 8A, 8B and 8C are explanatory diagrams of examples of a L1 control signal according to Aspect 1.
Figure 8B:
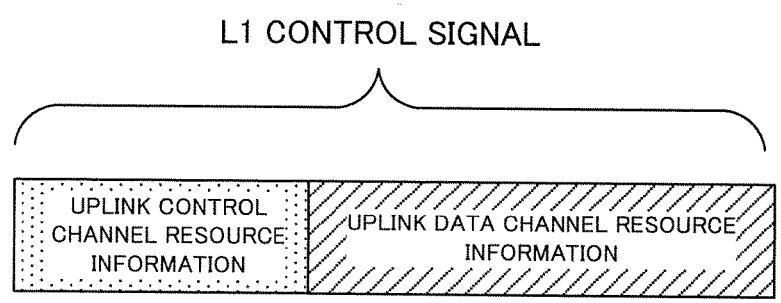
Figure 8C:
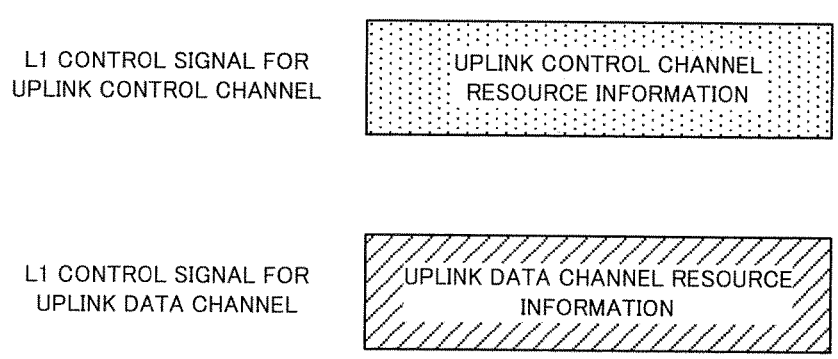

FIG. 8 is a diagram illustrating an example of scheduling according to Aspect 1. In FIG. 8, the radio base station allocates (schedules) radio resources (e.g. PRBs) to the uplink control channel and the uplink data channel. Resource information indicating radio resources allocated to the uplink control channel and the uplink data channel may be transmitted to the user terminal by the single L1 control signal (FIGS. 8A and 8B), or may be transmitted to the user terminal by the different L1 control signals (FIG. 8C).

Further, the radio base station may allocate common PRBs (identical PRBs) to the uplink control channel and the uplink data channel. In this case, as illustrated in FIG. 8A, the user terminal receives the L1 control signal including resource information indicating the common PRBs. The user terminal spatially multiplexes the uplink control channel and the uplink data channel on the common PRBs. Thus, by using common resource information for the uplink control channel and the uplink data channel, it is possible to reduce a downlink overhead.

Alternatively, the radio base station may individually allocate PRBs for the uplink control channel and PRBs for the uplink data channel (the PRBs may include PRBs that partially overlap). In this case, as illustrated in FIG. 8B, the user terminal receives the single L1 control signal including resource information indicating the PRBs allocated to the uplink control channel and resource information indicating the PRBs allocated to the uplink data channel. The user terminal transmits the uplink control channel or/and the uplink data channel by using the allocated PRBs. An information amount transmitted on the uplink control channel is smaller than an information amount transmitted on the uplink data channel, so that, by varying PRBs to be allocated to the uplink control channel and the uplink data channel, it is possible to improve radio resource use efficiency.

In this regard, in FIGS. 8A and 8B, transmission power of the uplink control channel and the uplink data channel may be controlled according to a common Transmission Power Control (TPC) command. In this case, the common TPC command is transmitted to the user terminal by the L1 control signal illustrated in FIGS. 8A and 8B. The user terminal may determine the transmission power of the uplink data channel based on the TPC command or determine the transmission power of the uplink control channel based on the TPC command and a predetermined offset. In this regard, the predetermined offset may be used to increase the transmission power of the uplink control channel compared to the transmission power of the uplink data channel.

Meanwhile, when the PRBs for the uplink control channel and the PRBs for the uplink data channel are individually allocated to the user terminal as illustrated in FIG. 8C, the user terminal may receive the L1 control signal (e.g. downlink assignment) including the resource information indicating the PRBs allocated to the uplink control channel, and the L1 control signal (e.g. uplink grant) including the resource information indicating the PRBs allocated to the uplink data channel. The user terminal transmits the uplink control channel or/and the uplink data channel by using the PRBs allocated to the L1 control signal per layer.

In FIG. 8C, the transmission power of the uplink control channel and the uplink data channel may be controlled according to individual Transmission Power Control (TPC) commands. In this case, the L1 control signal for the uplink control channel and the L1 control signal for the uplink data channel may include different TPC commands, respectively.

In this regard, the user terminal performs transmission by using uplink control channel resources according to one of methods in FIGS. 8A to 8C when uplink control channel resource information can be obtained by the L1 control signal, and may perform transmission by using uplink control channel resources configured in advance by higher layer signaling when the uplink control channel resource information cannot be obtained by the L1 control signal. Consequently, in a case of, for example, periodic CQI or a Scheduling Request (SR) configured independently from DL data allocation or UL data allocation, it is possible to eliminate a need for an instruction using the L1 control signal and reduce an overhead of a downlink control channel.

<<Aspect 2>>

Aspect 2 describes a case where uplink data channels and uplink control channels of a plurality of different user terminals are spatially multiplexed. In Aspect 2, an uplink data channel of one user terminal and an uplink control channel of another user terminal are spatially multiplexed by UL MIMO (multi-user MIMO). Hence, the user terminal may not include a plurality of antennas unlike Aspect 1. Differences from Aspect 1 will be mainly described below.

In Aspect 2, each user terminal may receive, from a radio base station, layer information for instructing layers (or/and sequences of uplink reference signals of this layers) that the uplink data channel and the uplink control channel are mapped on by higher layer signaling.

Alternatively, in Aspect 2, each user terminal may receive, from a radio base station, layer information for instructing layers (or/and sequences of uplink reference signals of this layers) that the uplink data channel and the uplink control channel are mapped on by the L1 control signal. In this regard, the L1 control signal may be the L1 control signal (e.g. downlink assignment) for instructing transmission of the uplink control channel or may be the L1 control signal (e.g. uplink grant) for instructing transmission of the uplink data channel.

Figure 9:
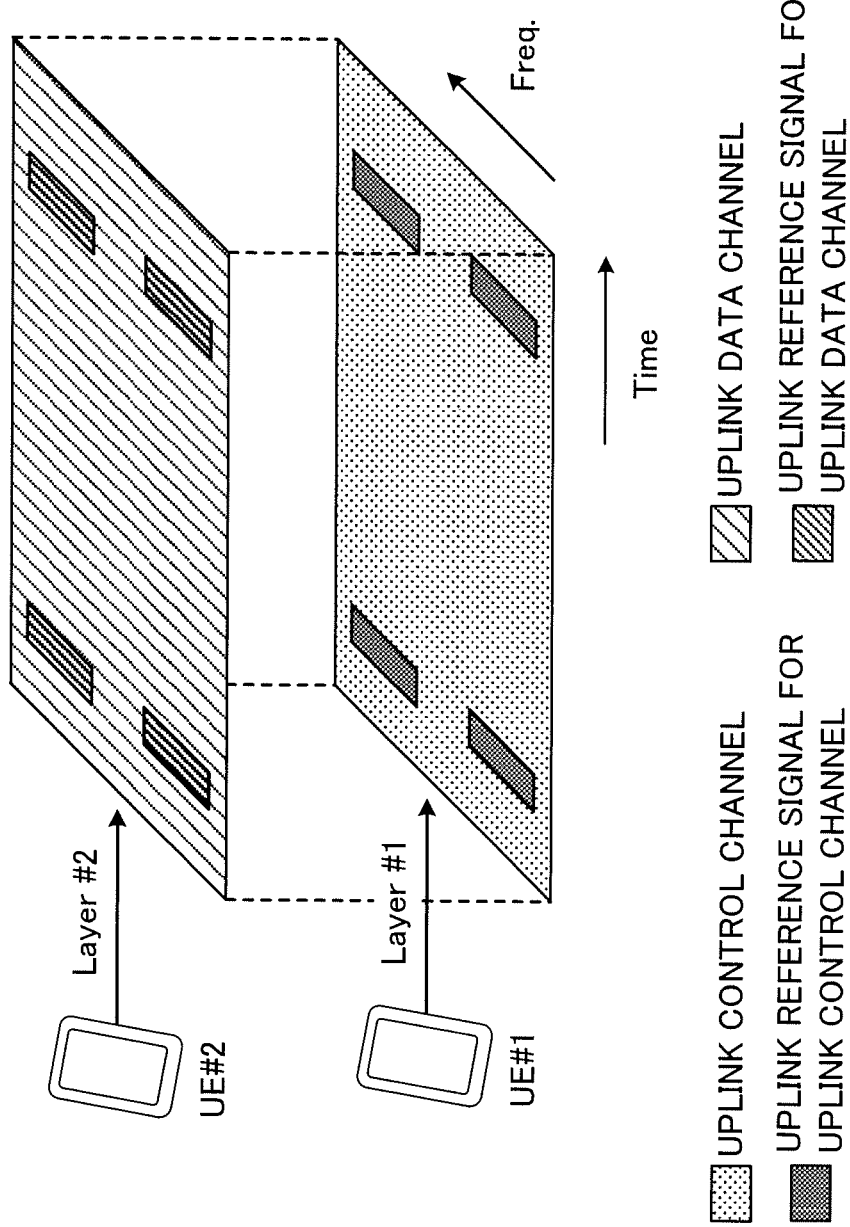
FIG. 9 is a diagram illustrating an example of layer mapping according to Aspect 2.

FIG. 9 is a diagram illustrating an example of layer mapping according to Aspect 2. For example, in FIG. 9, layer information received by the higher layer signaling or the L1 control signal instructs mapping the uplink control channel on the layer #1 and mapping the uplink data channel on the layer #2.

In FIG. 9, a user terminal #1 generates an uplink reference signal of the layer #1 based on the layer information to multiplex with an uplink control channel. Meanwhile, a user terminal #2 generates an uplink reference signal of the layer #2 based on the layer information to multiplex with an uplink data channel. Further, the user terminals #1 and #2 map the uplink reference signals of the layers #1 and #2 on identical resource elements.

Thus, layer mapping in a case where uplink data channels and uplink control channels of different user terminals are spatially multiplexed refers to multiplexing uplink reference signals orthogonal between layers with the uplink control channels or the uplink data channels.

Further, although not illustrated, in FIG. 9, when transmitting the uplink data channel, the user terminal #1 generates the uplink reference signal of the layer #2 to multiplex with the uplink data channel (map the uplink data channel on the layer #2). Similarly, when transmitting the uplink control channel, the user terminal #2 generates the uplink reference signal of the layer #1 to multiplex with the uplink control channel (map the uplink control channel on the layer #1).

<Electrical Multiplexing>

Next, electrical multiplexing of an uplink data channel and an uplink control channel according to a radio communication method according to this Embodiment will be described in detail.

According to electrical multiplexing (non-orthogonal multiplexing), a user terminal transmits an uplink data channel and an uplink control channel that are mapped on different layers at different transmission power by using identical radio resources. For example, as illustrated in FIG. 5, the user terminal may transmit the uplink control channel at higher transmission power than that of the uplink data channel. In this regard, the uplink data channel and the uplink control channel of a single user terminal may be electrically multiplexed or uplink data channels and uplink control channels of different user terminals may be electrically multiplexed.

Further, the radio base station extracts a desired signal by canceling an interference signal from a received signal by an interference canceller (e.g. SIC). More specifically, the radio base station extracts an uplink control channel by canceling an uplink data channel electrically multiplexed with an uplink control channel by the interference canceller. Similarly, the radio base station extracts an uplink control channel by cancelling an uplink control channel electrically multiplexed with the uplink data channel by the interference canceller.

As described above, according to the radio communication method according to this Embodiment, it is possible to allocate an uplink data channel to an entire system band by mapping the uplink data channel and an uplink control channel on different layers. As a result, it is possible to prevent shortage of radio resources for the uplink data channel caused by an increase in downlink traffic.

(Radio Communication System)

A configuration of a radio communication system according to one Embodiment of the present invention will be described below. The above radio communication method is applied to this radio communication system. In this regard, the radio communication method according to each of the above Aspects may be applied alone or may be applied in combination.

Figure 10:
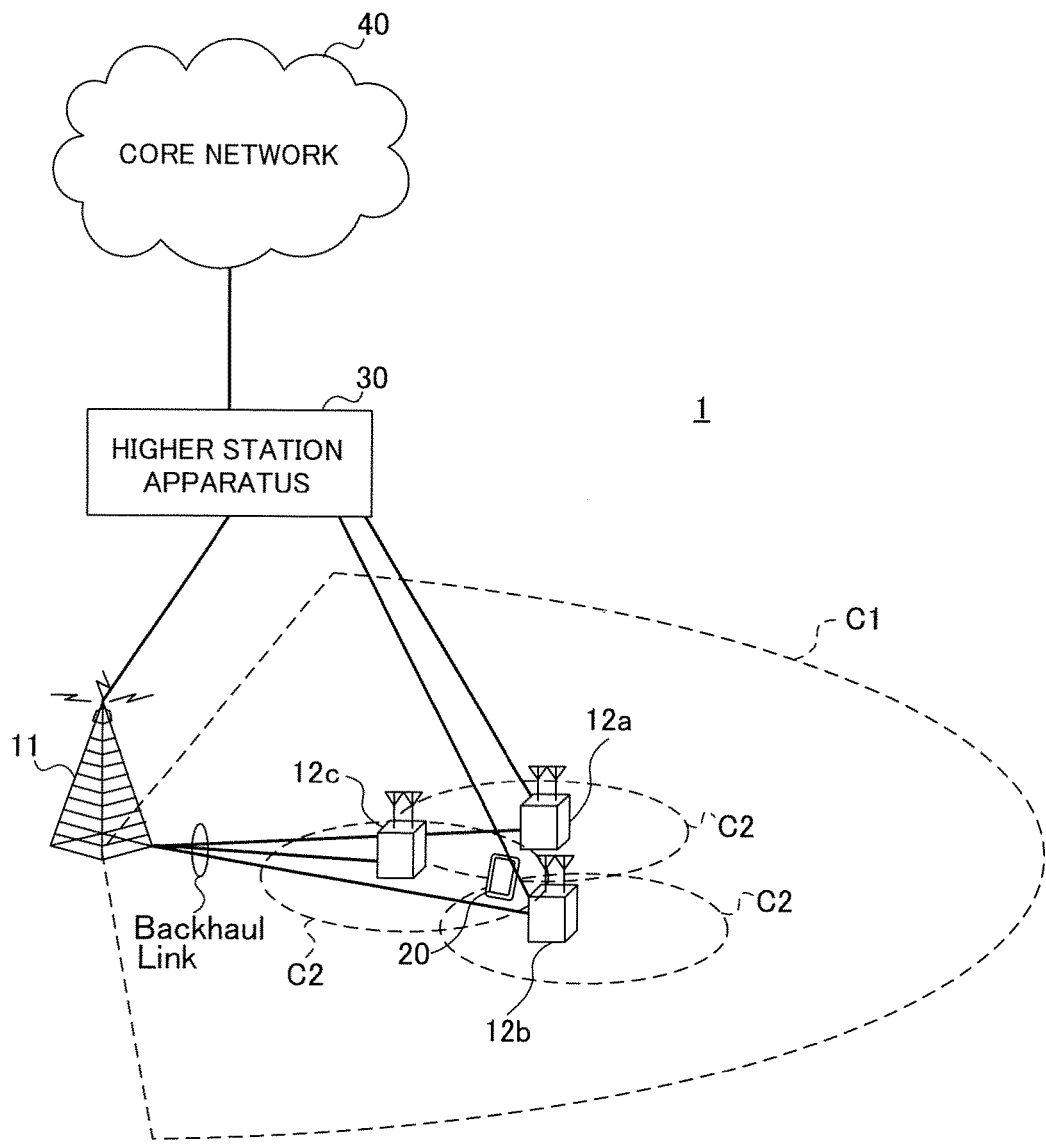
FIG. 10 is a diagram illustrating an example of a schematic configuration of a radio communication system according to this Embodiment.

FIG. 10 is a diagram illustrating an example of a schematic configuration of the radio communication system according to one Embodiment of the present invention. In a radio communication system 1, it is possible to apply Carrier Aggregation (CA) to aggregate a plurality of base frequency blocks (component carriers) whose one unit is a system bandwidth (e.g. 20 MHz) of an LTE system, and/or Dual Connectivity (DC). In this regard, the radio communication system 1 may be called SUPER 3G, LTE-A (LTE-Advanced), IMT-Advanced, 4G, 5G or FRA (Future Radio Access).

The radio communication system 1 illustrated in FIG. 10 includes a radio base station 11 that forms a macro cell C1, and radio base stations 12a to 12c that are located in the macro cell C1 and form small cells C2 narrower than the macro cell C1. Further, a user terminal 20 is located in the macro cell C1 and each small cell C2.

The user terminal 20 can connect to both of the radio base station 11 and the radio base stations 12. The user terminal 20 is assumed to concurrently use the macro cell C1 and the small cells C2 that use different frequencies according to CA or DC. Further, the user terminal 20 can apply CA or DC by using a plurality of cells (CCs) (e.g. six or more CCs).

The user terminal 20 and the radio base station 11 can communicate by using a carrier (an existing carrier that is called Legacy carrier) of a narrow bandwidth in a relatively low frequency band (e.g. 2 GHz). Meanwhile, the user terminal 20 and each radio base station 12 may use a carrier of a wide bandwidth in a relatively high frequency band (e.g. 3.5 GHz or 5 GHz) or may use the same carrier as that used by the radio base station 11. In this regard, a configuration of a frequency band used by each radio base station is not limited to this.

The radio base station 11 and each radio base station 12 (or the two radio base stations 12) can be configured to be connected by wires (e.g. optical fibers compliant with a CPRI (Common Public Radio Interface) or an X2 interface) or by radio.

The radio base station 11 and each radio base station 12 are connected to a higher station apparatus 30 and are connected to a core network 40 via the higher station apparatus 30. In this regard, the higher station apparatus 30 includes, for example, an access gateway apparatus, a Radio Network Controller (RNC), a Mobility Management Entity (MME) and the like, but is not limited thereto. Further, each radio base station 12 may be connected to the higher station apparatus 30 via the radio base station 11.

In this regard, the radio base station 11 is a radio base station having relatively wide coverage, and may be referred to as a macro base station, an aggregate node, an eNB (eNodeB) and a transmission/reception point. Further, each radio base station 12 is a radio base station having local coverage, and may be referred to as a small base station, a micro base station, a pico base station, a femto base station, a HeNB (Home eNodeB), a RRH (Remote Radio Head) and a transmission/reception point. The radio base stations 11 and 12 will be collectively referred to as the radio base station 10 unless distinguished below.

Each user terminal 20 is a terminal that supports various communication schemes such as LTE and LTE-A, and may include not only a mobile communication terminal but also a fixed communication terminal.

The radio communication system 1 applies OFDMA (Orthogonal Frequency-Division Multiple Access) to both of downlink and uplink as a radio access scheme. OFDMA is a multicarrier transmission scheme of dividing a frequency band into a plurality of narrow frequency bands (subcarriers), mapping data on each subcarrier and performing communication. In this regard, uplink and downlink radio access schemes are not limited to a combination of these. For example, SC-FDMA (Single Carrier-Frequency Division Multiple Access) may be applied to uplink. SC-FDMA is a single carrier transmission scheme of dividing a system bandwidth into a band configured by one or continuous resource blocks per terminal, using different bands for a plurality of terminals and reducing an interference between terminals. Alternatively, NOMA (Non-Orthogonal Multiple Access) (also referred to electrical multiple access) may be applied to downlink or/and uplink.

The radio communication system 1 uses a downlink shared channel (PDSCH: Physical Downlink Shared Channel), a broadcast channel (PBCH: Physical Broadcast Channel) and a L1/L2 control channel shared by each user terminal 20 as downlink channels. User data, higher layer control information and a SIB (System Information Block) are transmitted on the PDSCH. Further, a MIB (Master Information Block) is transmitted on the PBCH.

The L1/L2 control channel includes a downlink control channel (PDCCH (Physical Downlink Control Channel), an EPDCCH (Enhanced Physical Downlink Control Channel)), a PCFICH (Physical Control Format Indicator Channel), and a PHICH (Physical Hybrid-ARQ Indicator Channel)). Downlink Control Information (DCI) including scheduling information of the PDSCH and the PUSCH is transmitted on the PDCCH. The number of OFDM systems used for the PDCCH is transmitted on the PCFICH. Transmission acknowledgement information (ACK/NACK) of HARQ for the PUSCH is transmitted on the PHICH. The EPDCCH is subjected to frequency division multiplexing with the PDSCH (downlink shared data channel) and is used to transmit a DCI similar to the PDCCH.

The radio communication system 1 uses an uplink shared channel (PUCCH: Physical Uplink Shared Channel), an uplink control channel (PUCCH: Physical Uplink Control Channel) and a random access channel (PRACH: Physical Random Access Channel) shared by each user terminal 20 as uplink channels. User data and higher layer control information are transmitted on the uplink data channel. Uplink Control Information (UCI) including at least one of transmission acknowledgement information (ACK/NACK) and Radio Quality Information (CQI) is transmitted on an uplink data channel or an uplink control channel. A random access preamble for establishing connection with cells is transmitted on a random access channel.

<Radio Base Station>

Figure 11:
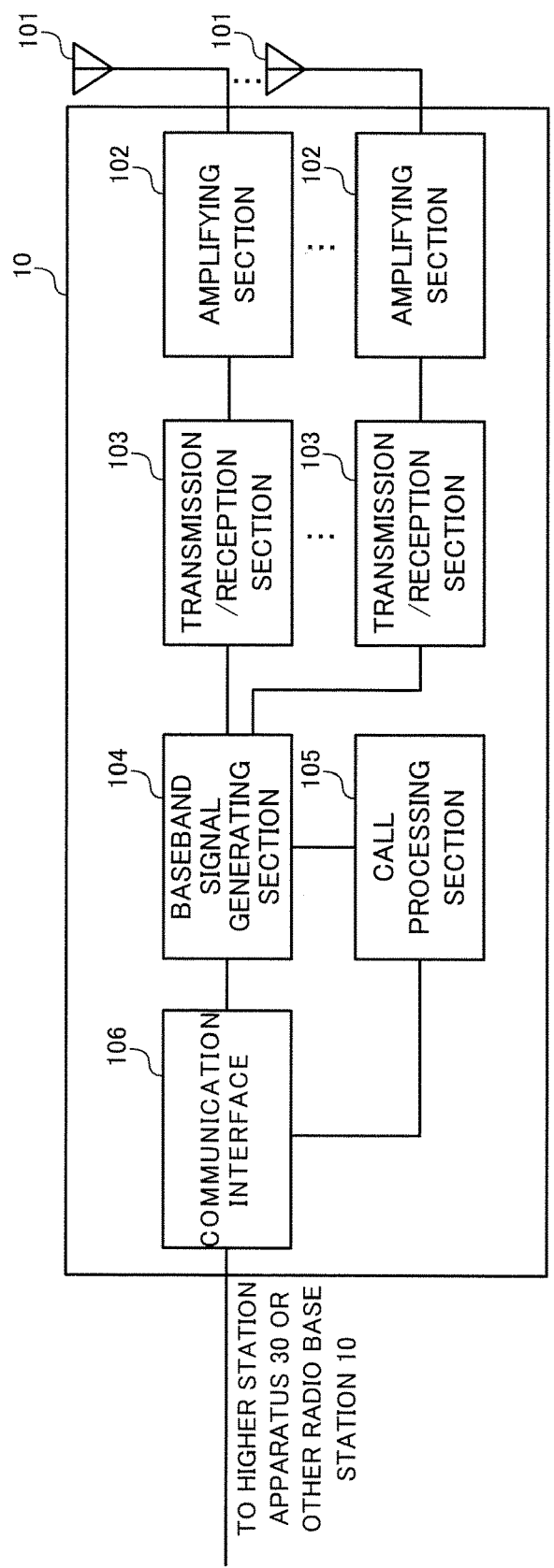
FIG. 11 is a diagram illustrating an example of an entire configuration of a radio base station according to this Embodiment.

FIG. 11 is a diagram illustrating an example of an entire configuration of the radio base station according to one Embodiment of the present invention. The radio base station 10 includes a plurality of transmission/reception antennas 101, amplifying sections 102, transmission/reception sections 103, a baseband signal processing section 104, a call processing section 105, and a communication interface 106. In this regard, the radio base station 10 needs to be configured to include one or more transmission/reception antennas 101, amplifying sections 102 and transmission/reception sections 103.

User data transmitted from the radio base station 10 to the user terminal 20 on downlink is input from the higher station apparatus 30 to the baseband signal processing section 104 via the communication interface 106.

The baseband signal processing section 104 performs processing of a PDCP (Packet Data Convergence Protocol) layer, segmentation and concatenation of the user data, transmission processing of a RLC (Radio Link Control)

layer such as RLC retransmission control, and MAC (Medium Access Control) retransmission control (such as transmission processing of HARQ (Hybrid Automatic Repeat reQuest)), and transmission processing such as scheduling, transmission format selection, channel coding, Inverse Fast Fourier Transform (IFFT) processing, and precoding processing on the user data to transfer to each transmission/reception section 103. Further, the baseband signal processing section 104 performs transmission processing such as channel coding and inverse fast Fourier transform on a downlink control signal, too, to transfer to each transmission/reception section 103.

Each transmission/reception section 103 converts a baseband signal precoded and output per antenna from each baseband signal processing section 104, into a signal of a radio frequency band to transmit. Each amplifying section 102 amplifies the radio frequency signal subjected to frequency conversion by each transmission/reception section 103, and transmits the radio frequency signal from each transmission/reception antenna 101.

Further, each transmission/reception section 103 transmits instruction information for instructing spatial multiplexing of an uplink data channel and an uplink control channel, to the user terminal 20 by higher layer signaling. Furthermore, each transmission/reception section 103 may transmit layer information for instructing layers that an uplink data channel and an uplink control channel are mapped on, to the user terminal 20 by higher layer signaling or the L1 control signal.

The transmission/reception sections 103 can be composed of a transmitter/receiver, a transmission/reception circuit or a transmission/reception device described based on a common knowledge in a technical field of the present invention. In this regard, the transmission/reception sections 103 may be composed of an integrated transmission/reception section or may be composed of a transmission section and a reception section.

Meanwhile, each amplifying section 102 amplifies a radio frequency signal as an uplink signal received by each transmission/reception antenna 101. Each transmission/reception section 103 receives the uplink signal amplified by each amplifying section 102. Each transmission/reception section 103 performs frequency conversion on the received signal into a baseband signal, and outputs the baseband signal to the baseband signal processing section 104.

The baseband signal processing section 104 performs Fast Fourier Transform (FFT) processing, Inverse Discrete Fourier Transform (IDFT) processing, error correcting decoding, reception processing of MAC retransmission control, and reception processing of a RLC layer and a PDCP layer on user data included in the input uplink signal to transfer to the higher station apparatus 30 via the communication interface 106. The call processing section 105 performs call processing such as configuration and release of a communication channel, state management of the radio base station 10, and management of radio resources.

The communication interface 106 transmits and receives signals to and from the higher station apparatus 30 via a predetermined interface. Further, the communication interface 106 may transmit and receive (backhaul signaling) signals to and from the neighboring radio base station 10 via an inter-base station interface (e.g. optical fibers compliant with the CPRI (Common Public Radio Interface) or the X2 interface).

Figure 12:
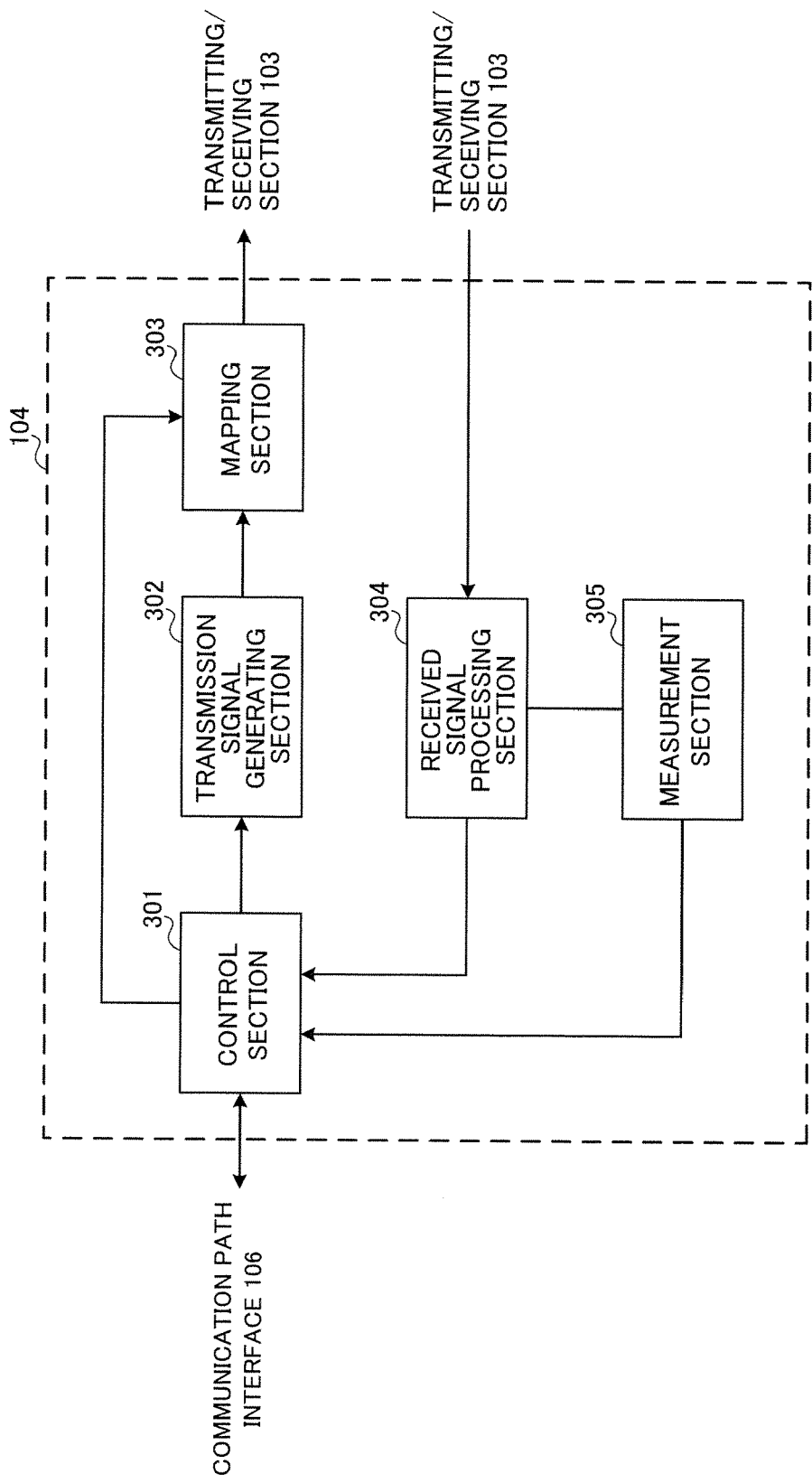
FIG. 12 is a diagram illustrating an example of a function configuration of the radio base station according to this Embodiment.

FIG. 12 is a diagram illustrating an example of a function configuration of the radio base station according to this Embodiment. In addition, FIG. 12 mainly illustrates function blocks of characteristic portions in this Embodiment, and it is assumed that the radio base station 10 has other function blocks required for radio communication, too. As shown in FIG. 12, the baseband signal processing section 104 includes at least a control section 301, a transmission signal generating section 302, a mapping section 303, a received signal processing section 304 and a measurement section 305.

The control section 301 controls the entire radio base station 10. The control section 301 controls, for example, generation of a downlink signal in the transmission signal generating section 302, mapping of signals in the mapping section 303 and reception processing of signals in the received signal processing section 304.

More specifically, the control section 301 performs control to cause the received signal processing section 304 to demultiplex an uplink data channel and an uplink control channel that are mapped on different layers. More specifically, the control section 301 demultiplexes the uplink data channel and the uplink control channel based on a channel state of each layer measured by the measurement section 305.

In this regard, the control section 301 may perform control to perform reception processing on an uplink data channel and an uplink control channel as UL MIMO (including single-user/multi-user MIMO) signals. Alternatively, the control section 301 may perform control to perform reception processing on an uplink data channel and an uplink control channel as NOMA signals.

Further, the control section 301 may control layer mapping in the user terminal 20. For example, the control section 301 may perform control to cause the transmission signal generating section 302 to generate instruction information for instructing spatial multiplexing of an uplink data channel and an uplink control channel. Further, the control section 301 may perform control to cause the transmission signal generating section 302 to generate layer information for instructing layers that an uplink data channel and an uplink control channel are mapped on.

Furthermore, the control section 301 controls allocation (scheduling) of radio resources on a downlink data channel, an uplink data channel and/or an uplink control channel. The control section 301 performs control to transmit resource information indicating allocated radio resources by using a single or a plurality of L1 control signals (FIG. 8). In this regard, the control section 301 may perform control to transmit resource information for the uplink control channel by higher layer signaling.

Further, the control section 301 controls transmission power of the uplink control channel and/or the uplink data channel. For example, the control section 301 may control uplink transmission power of each layer to increase received signal power of the layer that the uplink control channel is mapped on compared to received signal power of the layer that the uplink data channel is mapped on. Alternatively, the control section 301 may control uplink transmission power of each layer to increase the received signal power of the layer that the uplink data channel is mapped on compared to the received signal power of the layer that the uplink control channel is mapped on. In this regard, the control section 301 may perform control to transmit the L1 control signal including a Transmission Power Control (TPC) command used for closed loop control, and transmit parameters used for open-loop control by higher layer signaling.

The control section 301 can be composed of a controller, a control circuit and a control apparatus described based on the common knowledge in the technical field according to the present invention.

The transmission signal generating section 302 generates a downlink signal (including a downlink data channel, a downlink control channel (L1 control signal) and a downlink reference signal) based on an instruction from the control section 301 to output to the mapping section 303.

The transmission signal generating section 302 can be composed of a signal generator, a signal generation circuit and a signal generating apparatus described based on the common knowledge in the technical field according to the present invention.

The mapping section 303 maps the downlink signal generated by the transmission signal generating section 302, on predetermined radio resources based on the instruction from the control section 301, and outputs the downlink signal to the transmission/reception section 103. The mapping section 303 can be composed of a mapper, a mapping circuit or a mapping apparatus described based on the common knowledge in the technical field according to the present invention.

The received signal processing section 304 performs reception processing (e.g. demapping, demodulation and decoding) on an uplink signal (including an uplink data channel, an uplink control channel and an uplink reference signal) transmitted from the user terminal 20. The received signal processing section 304 outputs a processing result to the control section 301.

More specifically, the received signal processing section 304 performs reception processing on the uplink data channel and the uplink control channel that are mapped on the different layers, as UL (MIMO (including single-user/multi-user MIMO) or NOMA signals according to the instruction from the control section 301.

The received signal processing section 304 can be composed of a signal processor, a signal processing circuit or a signal processing apparatus and a measurement instrument, a measurement circuit or a measurement apparatus described based on the common knowledge in the technical field according to the present invention.

The measurement section 305 performs measurement by using the uplink reference signal from the user terminal 20, and outputs a measurement result to the control section 301. More specifically, the measurement section 305 measures (estimates) a channel state of each layer by using the uplink reference signals orthogonal or quasi-orthogonal between the layers.

The measurement section 305 can be composed of a signal processor, a signal processing circuit or a signal processing apparatus and a measurement instrument, a measurement circuit or a measurement apparatus described based on the common knowledge in the technical field according to the present invention.

<User Terminal>

Figure 13:
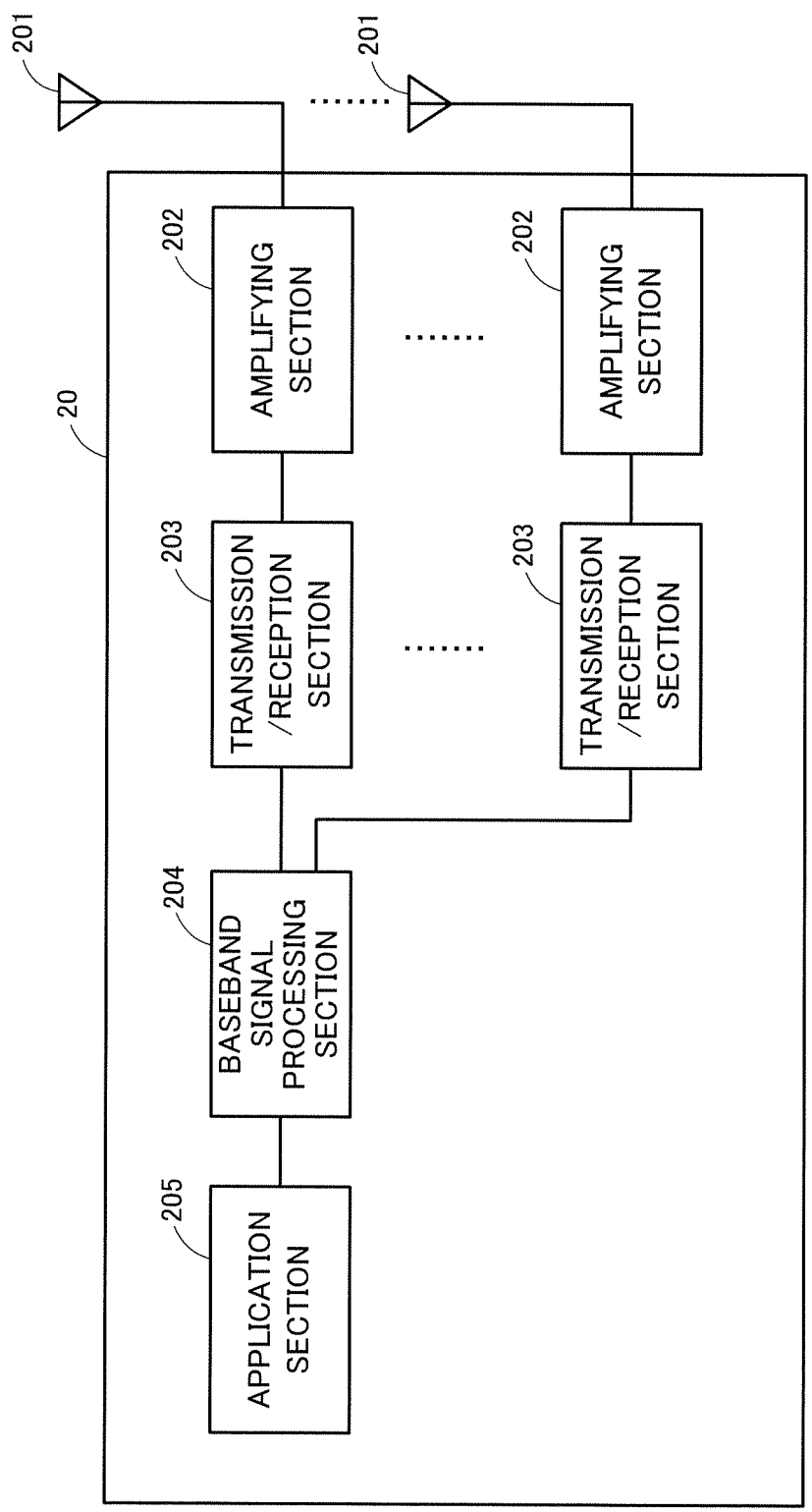
FIG. 13 is a diagram illustrating an example of an entire configuration of a user terminal according to this Embodiment.

FIG. 13 is a diagram illustrating an example of an entire configuration of the user terminal according to one Embodiment of the present invention. The user terminal 20 includes a plurality of transmission/reception antennas 201 for MIMO transmission, amplifying sections 202, transmission/reception sections 203, a baseband signal processing section 204, and an application section 205.

The amplifying sections 202 amplify radio frequency signals received at a plurality of transmission/reception antennas 201. Each transmission/reception section 203 receives a downlink signal amplified by each amplifying section 202. Each transmission/reception section 203 performs frequency conversion on the received signal into a baseband signal, and outputs the baseband signal to the baseband signal processing section 204.

The baseband signal processing section 204 performs FFT processing, error correcting decoding, reception processing of retransmission control and the like on the input baseband signal. The baseband signal processing section 204 transfers downlink user data to the application section 205. The application section 205 performs processing concerning layers higher than a physical layer and a MAC layer. Further, the baseband signal processing section 204 transfers broadcast information among the downlink data, too, to the application section 205.

Meanwhile, the application section 205 inputs uplink user data to the baseband signal processing section 204. The baseband signal processing section 204 performs transmission processing of retransmission control (e.g. HARQ transmission processing), channel coding, precoding, Discrete Fourier Transform (DFT) processing, IFFT processing and the like on the uplink user data to transfer to each transmission/reception section 203. Each transmission/reception section 203 converts the baseband signal output from the baseband signal processing section 204 into a signal of a radio frequency band to transmit. Each amplifying section 202 amplifies the radio frequency signal subjected to the frequency conversion by each transmission/reception section 203 to transmit from each transmission/reception antenna 201.

In this regard, each transmission/reception section 203 receives instruction information for instructing spatial multiplexing of an uplink data channel and an uplink control channel, from the radio base station 10 by higher layer signaling. Further, each transmission/reception section 203 may receive layer information for instructing the layers that the uplink data channel and the uplink control channel are mapped on, from the radio base station 10 by the higher layer signaling or the L1 control signal.

Furthermore, each transmission/reception section 203 may receive the single L1 control signal indicating radio resources (e.g. PRBs) commonly allocated to the uplink data channel and the uplink control channel (FIG. 8A). Alternatively, each transmission/reception section 203 may receive the single layer 1 control signal indicating both of the radio resources allocated to the uplink data channel and the radio resources allocated to the uplink control channel (FIG. 8B). Alternatively, each transmission/reception section 203 may receive a plurality of layer 1 control signals individually indicating the radio resources allocated to the uplink data channel and the radio resources allocated to the uplink control channel (FIG. 8C).

The transmission/reception sections 203 can be composed of a transmitter/receiver, a transmission/reception circuit or a transmission/reception apparatus described based on the common knowledge in the technical field according to the present invention. Further, the transmission/reception sections 203 may be composed of an integrated transmission/reception section or may be composed of a transmission section and a reception section.

Figure 14:
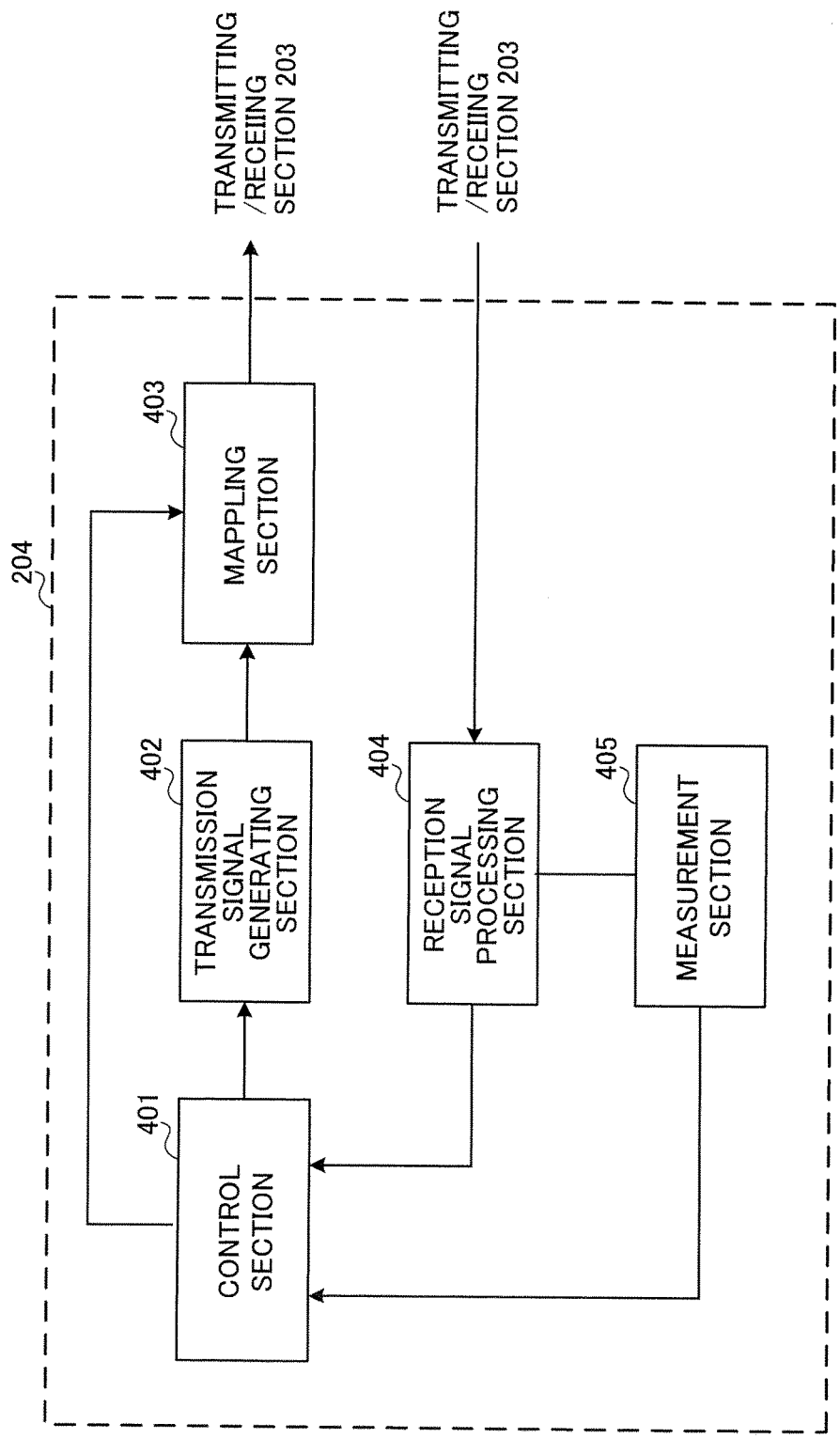
FIG. 14 is a diagram illustrating an example of a function configuration of the user terminal according to this Embodiment.

FIG. 14 is a diagram illustrating an example of a function configuration of the user terminal according to this Embodiment. In addition, FIG. 14 mainly illustrates function blocks of characteristic portions in this Embodiment, and it is assumed that the user terminal 20 has other function blocks required for radio communication, too. As shown in FIG. 14, the baseband signal processing section 204 of the user terminal 20 includes a control section 401, a transmission signal generating section 402, a mapping section 403, a received signal processing section 404, and a measurement section 405.

The control section 401 controls the entire user terminal 20. The control section 401 controls, for example, generation of signals in the transmission signal generating section 402, mapping of signals in the mapping section 403 and reception processing of signals in the received signal processing section 404.

Further, the control section 401 controls layer mapping of the uplink data channel and the uplink control channel. More specifically, the control section 401 maps the uplink data channel and the uplink control channel on different layers.

Further, the control section 401 performs control to multiplex the uplink data channel and the uplink control channel that are mapped on the different layers, on the identical radio resources to transmit. Furthermore, the control section 401 performs control to generate uplink reference signals orthogonal or quasi-orthogonal per layer and map the uplink reference signals on the identical radio resources (e.g. resource elements) to transmit (FIG. 4). More specifically, the control section 401 may perform control to cause the transmission signal generating section 402 to generate the uplink reference signals of sequences orthogonal or quasi-orthogonal per layer.

Further, the control section 401 may perform control to spatially multiplex the uplink data channel and the uplink control channel on the identical radio resources to transmit. Furthermore, when instructed by instruction information notified by the higher layer signaling to spatially multiplex the uplink data channel and the uplink control channel, the control section 401 may perform control to map the uplink data channel and the uplink control channel on the different layers.

Still further, the control section 401 may perform control to map the uplink data channel and the uplink control channel on the different layers based on the layer information received by the higher layer signaling or the layer 1 control signal (FIG. 6).

Moreover, when transmitting the uplink data channel without spatially multiplexing the uplink data channel with the uplink control channel, or when mapping the uplink data channel on a first layer and spatially multiplexing the uplink data channel with the uplink control channel to transmit, the control section 401 may perform to map the uplink control channel on the first layer and the uplink data channel on a second layer (FIG. 7). In this regard, the number of layers is not limited to two, and the uplink data channel or/and the uplink control channel may be mapped on a plurality of layers.

Further, the control section 401 may perform to spatially multiplex the uplink data channel and the uplink control channel on radio resources indicated by the single layer 1 control signal received by each transmission/reception section 203 or the layer 1 control signal of each layer (FIG. 8).

Alternatively, the control section 401 may perform control to electrically multiplex (non-orthogonal multiplexing) the uplink data channel and the uplink control channel on identical radio resources to transmit.

The control section 401 can be composed of a controller, a control circuit or a control apparatus described based on the common knowledge in the technical field according to the present invention.

The transmission signal generating section 402 generates an uplink signal (including an uplink control signal, an uplink data signal and an uplink reference signal) based on an instruction from the control section 401, and outputs the uplink signal to the mapping section 403. For example, the transmission signal generating section 402 generates an uplink control channel including UCI. Further, the transmission signal generating section 402 generates an uplink data channel including uplink user data.

More specifically, the transmission signal generating section 402 generates uplink reference signals orthogonal or quasi-orthogonal between layers based on an instruction from the control section 401. More specifically, the transmission signal generating section 402 may generate the uplink reference signal of each layer by using sequences orthogonal or quasi-orthogonal between the layers.

The transmission signal generating section 402 can be composed of a signal generator, a signal generation circuit and a signal generating apparatus described based on the common knowledge in the technical field according to the present invention.

The mapping section 403 maps the uplink signal (e.g. an uplink control channel, an uplink data channel and an uplink reference signal) generated by the transmission signal generating section 402, on radio resources based on the instruction from the control section 401, and outputs the uplink signal to the transmission/reception section 203. The mapping section 403 can be composed of a mapper, a mapping circuit or a mapping apparatus described based on the common knowledge in the technical field according to the present invention.

The received signal processing section 404 performs reception processing (e.g. demapping, demodulation and decoding) on the downlink signal (including a downlink control channel (L1 control signal) and a downlink data channel). The received signal processing section 404 outputs information received from the radio base station 10 to the control section 401. The received signal processing section 404 outputs, for example, broadcast information, system information, control information of higher layer signaling such as RRC signaling and a DCI to the control section 401.

The received signal processing section 404 can be composed of a signal processor, a signal processing circuit or a signal processing apparatus described based on the common knowledge in the technical field according to the present invention. Further, the received signal processing section 404 can configure the reception section according to the present invention.

The measurement section 405 measures a channel state based on a downlink reference signal (e.g. a CRS or a CRI-RS) from the radio base station 10, and outputs a measurement result to the control section 401.

The measurement section 405 can be composed of a signal processor, a signal processing circuit or a signal processing apparatus and a measurement instrument, a measurement circuit or a measurement apparatus described based on the common knowledge in the technical field according to the present invention.

In addition, the block diagrams used to describe the Embodiment illustrate blocks in function units. These function blocks (components) are realized by an arbitrary combination of hardware and software. Further, means for realizing each function block is not limited in particular. That is, each function block may be realized by one physically jointed apparatus or may be realized by a plurality of apparatuses formed by connecting two or more physically separate apparatuses by wires or by radio.

For example, part or all of the functions of the radio base station 10 and the user terminal 20 may be realized by using hardware such as an ASIC (Application Specific Integrated Circuit), a PLD (Programmable Logic Device) and a FPGA (Field Programmable Gate Array). Further, the radio base station 10 and the user terminal 20 may be realized by a computer apparatus including a processor (CPU: Central Processing Unit), a network connection communication interface, a memory, and a computer-readable storage medium that stores programs. That is, the radio base stations and the user terminal according to one Embodiment of the present invention may function as a computer that performs processing of the radio communication method according to the present invention.

In this regard, the processor and the memory are connected by a bus that communicates information. Further, the computer-readable recording medium is, for example, a storage medium such as a flexible disk, a magnetooptical disk, a ROM (Read Only Memory), an EPROM (Erasable Programmable ROM), a CD-ROM (Compact Disc-ROM), a RAM (Random Access Memory) or a hard disk. Furthermore, the programs may be transmitted from a network via telecommunications lines. Still further, the radio base station 10 and the user terminal 20 may include an input apparatus such as an input key or an output apparatus such as a display.

Function configurations of the radio base station 10 and the user terminal 20 may be realized by the above-described hardware, may be realized by a software module executed by the processor or may be realized by a combination of both. The processor causes an operating system to operate and control the entire user terminal. Further, the processor reads programs, a software module or data from the storage medium out to the memory, and executes various types of processing according to the program, the software module or the data.

In this regard, the programs need to be programs that cause the computer to execute respective operations described in the above Embodiment. For example, the control section 401 of the user terminal 20 may be realized by a control program stored in the memory and operated by the processor or other function blocks may be realized likewise, too.

Further, software and instructions may be transmitted and received via transmission media. When, for example, the software is transmitted from websites, servers or other remote sources by using wired techniques such as coaxial cables, optical fiber cables, twisted pairs and digital subscriber lines (DSL) and/or radio techniques such as infrared rays, radio waves and microwaves, these wired techniques and/or radio technique are included in a definition of the transmission media.

In this regard, each term that is described in this Description and/or is necessary to understand this Description may be replaced with terms having identical or similar meanings. For example, a channel and/or a symbol may be a signal (signaling). Further, a signal may be a message. Furthermore, a Component Carrier (CC) may be called a carrier frequency and a cell.

Still further, the pieces of information and parameters described in this Description may be expressed by absolute values, may be expressed by relative values of predetermined values or may be expressed by other pieces of corresponding information. For example, a radio resource may be indicated by an index.

The pieces of information and the signals described in this Description may be represented by using one of various different techniques. For example, the data, the instructions, the commands, the pieces of information, the signals, the bits, the symbols and the chips mentioned in the above description may be represented by voltages, currents, electromagnetic waves, magnetic fields or magnetic particles, optical fields, photons or arbitrary combinations thereof.

Each Aspect/Embodiment described in this Description may be used alone, may be used in combination or may be switched and used when carried out. Further, notification of predetermined information (e.g. notification of "being X") may be not only explicitly performed but also implicitly performed (e.g. this predetermined information is not notified).

Notification of information is not limited to the Aspects/Embodiment described in this Description and may be performed by other methods. For example, the notification of the information may be performed by physical layer signaling (e.g. DCI (Downlink Control Information) and UCI (Uplink Control Information)), higher layer signaling (e.g. RRC (Radio Resource Control) signaling, MAC (Medium Access Control) signaling, broadcast information (MIB (Master Information Block) and SIB (System Information Block))), other signals and combinations thereof. Further, the RRC signaling may be referred to as a RRC message and may be, for example, a RRC connection setup message or a RRC connection reconfiguration message.

Each Aspect/Embodiment described in this Description may be applied to LTE (Long Term Evolution), LTE-A (LTE-Advanced), SUPER 3G, IMT-Advanced, 4G, 5G, FRA (Future Radio Access), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), systems that use other appropriate systems and/or next-generation systems that are enhanced based on these systems.

Orders of the processing procedures, the sequences and the flowchart of each Aspect/Embodiment described in this Description may be rearranged unless contradictions arise. For example, the method described in this Description presents various step elements in an exemplary order and is not limited to the presented specific order.

As described above, the present invention is specifically described, but it is obvious to a person skilled in the art that the present invention is not limited to the Embodiment described in the Description. The present invention is capable of being carried into practice as modified and changed aspects without departing from the subject matter and scope of the present invention defined by the description of the scope of the claims. Accordingly, the description of the Description is intended for illustrative explanation, and does not have any restrictive meaning to the present invention.

The present application is based on Japanese Patent Application No. 2015-171453 filed on Aug. 31, 2015, entire content of which is expressly incorporated by reference herein.

The invention claimed is:

1. A user terminal comprising:
a processor that maps an uplink data channel and an uplink control channel on different layers; and
a transmitter that multiplexes on an identical radio resource the uplink data channel and the uplink control channel mapped on the different layers to transmit,
wherein the transmitter spatially multiplexes the uplink data channel and the uplink control channel on the identical radio resource to transmit; and
a receiver that receives instruction information for instructing spatial multiplexing of the uplink data channel and the uplink control channel by higher layer signaling, wherein the processor maps the uplink data channel and the uplink control channel on the different layers when the instruction information instructs the spatial multiplexing.

2. The user terminal according to claim 1, wherein the transmitter maps uplink reference signals orthogonal or quasi-orthogonal between layers, on an identical resource element to transmit.

3. The user terminal according to claim 1, wherein
the receiver receives layer information indicating the layers that the uplink data channel and the uplink control channel are mapped on by the higher layer signaling or a layer 1 control signal, and
the processor maps the uplink data channel and the uplink control channel on the different layers based on the layer information.

4. The user terminal according to claim 1, wherein the processor maps the uplink data channel on a first layer when transmitting the uplink data channel without spatially multiplexing the uplink data channel with the uplink control channel, and maps the uplink control channel on the first layer and the uplink data channel on a second layer when spatially multiplexing and transmitting the uplink data channel and the uplink control channel.

5. The user terminal according to claim 1, wherein
the receiver receives a single layer 1 control signal indicating a radio resource commonly allocated to the uplink data channel and the uplink control channel, receives the single layer 1 control signal indicating both of a radio resource allocated to the uplink data channel and a radio resource allocated to the uplink control channel, or receives a plurality of layer 1 control signals individually indicating the radio resource allocated to the uplink data channel and the radio resource allocated to the uplink control channel, and
the transmitter spatially multiplexes the uplink data channel and the uplink control channel on the radio resource indicated by the single layer 1 control signal the plurality of layer 1 control signals to transmit.

6. The user terminal according to claim 1, wherein the transmitter performs electrical multiplexing on the uplink data channel and the uplink control channel on the identical radio resource to transmit.

7. A radio base station comprising:
a receiver that receives an uplink data channel and an uplink control channel mapped on different layers and multiplexed on an identical radio resource; and
a processor that demultiplexes the uplink data channel and the uplink control channel,
wherein the uplink data channel and the uplink control channel are spatially multiplexed on the identical radio resource to transmit; and
a transmitter that transmits instruction information for instructing spatial multiplexing of the uplink data channel and the uplink control channel by higher layer signaling, wherein the uplink data channel and the uplink control channel are mapped on the different layers when the instruction information instructs the spatial multiplexing.

8. A radio communication method of a user terminal and a radio base station comprising: at the user terminal,
mapping an uplink data channel and an uplink control channel on different layers; and
multiplexing on an identical radio resource the uplink data channel and the uplink control channel mapped on the different layers,
wherein in the multiplexing, the uplink data channel and the uplink control channel are spatially multiplexed on the identical radio resource to transmit; and
receiving instruction information for instructing spatial multiplexing of the uplink data channel and the uplink control channel by higher layer signaling, wherein the user terminal maps the uplink data channel and the uplink control channel on the different layers when the instruction information instructs the spatial multiplexing.

* * * * *